UNITED STATES PATENT OFFICE.

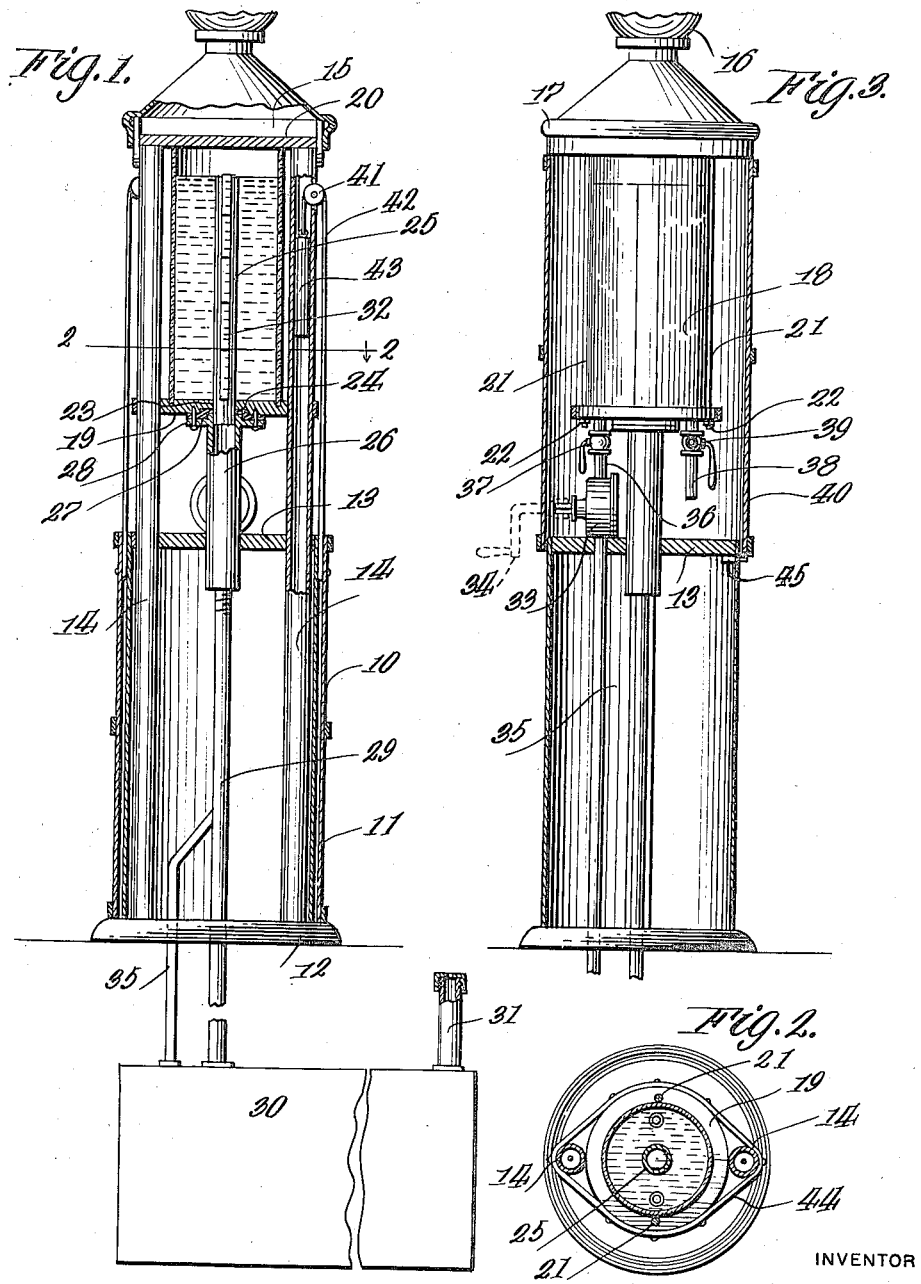

ELBY R. MILLS, OF SABINA, OHIO.

LIQUID-DISPENSER.

1,278,710.  Specification of Letters Patent.  Patented Sept. 10, 1918.

Application filed October 12, 1917. Serial No. 196,192.

*To all whom it may concern:*

Be it known that I, ELBY R. MILLS, a citizen of the United States, residing at Sabina, in the county of Clinton and State of Ohio, have invented certain new and useful Improvements in Liquid-Dispensers, of which the following is a specification.

This invention has relation to dispensing apparatus, and has for an object to provide an apparatus or machine for measuring and delivering liquid fuel, such as gasolene, although it will be presently apparent that the apparatus may be used or adapted for use in dispensing liquids of any nature whatsover.

Another object of the invention is to provide a liquid fuel dispensing apparatus having the above named characteristics and embodying a transparent container to be placed in full view of the purchaser and means for introducing the fuel into the container in any quantity desired, and subsequently delivering the fuel from said container.

Another object of the invention is to provide a liquid fuel dispensing apparatus of the nature above described embodying a container of transparent material and a gage mounted therein whereby the quantity of fuel within the container may be noted by noting the proximity of the level of the fuel to any of the graduations of the scale, and means for adjusting the scale vertically when one container of the apparatus is substituted for another or when different containers are used which vary in capacity, one from the other.

A still further object of the invention is to provide a liquid fuel dispensing apparatus embodying a transparent container for temporarily receiving the fuel to permit its measurement, and a pump whereby the container may be filled from a tank or other source of supply.

A still further object of the invention is to provide a liquid fuel dispensing apparatus suitably mounted upon a standard and embodying the elements described above, with a casing mounted for vertical movement and suitably counter weighted whereby the pumping, measuring and other parts of the apparatus may be entirely inclosed and the casing locked in position to prevent tampering with the mechanism.

In addition to the foregoing my invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:—

Figure 1, is a view in vertical section of a liquid fuel dispensing apparatus constructed in accordance with my invention, illustrating the movable casing in lowered position.

Fig. 2, is a horizontal section taken on the line 2—2 of the preceding figure, and Fig. 3, is a view in vertical section taken through the apparatus, illustrating the casing in a raised position.

With reference to the drawings, 10 indicates generally the base, of my improved dispensing apparatus, in the nature of a cylinder 11 of sheet metal or the like resting upon a circular base 12 and covered by a cover plate 13. A pair of tubular standards or uprights 14 project upward from the base plate 12 and extend through openings in the cover 13 to a distance above the cover for the support of the superstructure which includes a conical cap member 15 which may support a globe 16 to contain a light for advertising purposes. The base portion of the cap 15 is formed with a bead or flange 17 for a purpose which will be presently obvious.

A container 18 is provided which is preferably formed of glass and which may be open at both ends, its lower end resting upon the circular plate 19 which is disposed between the uprights the container being covered by means of a plate 20. The upper and lower edges of the container 19 may rest in grooves in the plates 19 and 20 to make the fluid tight joint, and said plates 19 and 20 may be held together and the container 18 securely bound therebetween by means of rods 21 anchored at their upper ends in the plate 20, for instance, and their other ends extending through openings in the plate 19 whereby nuts 22 may be applied to the rod.

The lower plate 19 is formed with a central opening 23 and the lower surface of the plate is grooved around the opening as indicated at 24. A tube 25 is disposed within the container 19 with its lower end extending through the opening 23 of the plate, projecting below the lower surface of the plate slightly to enter the upper end of a tube 26 which is disposed vertically in alinement with the tube 25. The upper end of the tube 26 bears against a gasket 27 in a manner to force the gasket into said groove 24 whereby to compress the material of the gasket around the tube 25 to secure a fluid tight joint. A flange 28 may be formed upon the tube 26 and bolts may extend through said flange and into the plate 19 for a purpose which is now obvious. The lower end of the tube 26 is threaded interiorly to receive the upper end of the correspondingly threaded overflow pipe 29, the lower end of said pipe entering a tank 30 which contains a supply of fuel, said pipe 29 however extending only through the upper wall of the tank. The tank 30 is furthermore provided with a vent 31. One or more scales or dial plates 32 are secured to the overflow pipe 25 within the container for measuring purposes in a manner which will be presently obvious.

A rotary pump, indicated generally at 33 is mounted on the plate 13 to be operated by means of a crank 34. This pump may be of any approved construction and hence a detailed description thereof is not considered necessary for the purposes of this application. The inlet of the pump is connected to a pipe 35 which extends therefrom downward into the supply tank 30 to a point below the lowest level of fluid within the tank, while the outlet of the pump is connected to a pipe 36 which enters an opening in the plate 19, said pipe being controlled by means of a manually operable valve 37. A pipe 39 is also connected to an opening in the plate 19 in communication with the transparent container 18 and is controllable by means of a manually operable valve 39, the pipe 38 being designated for connection to a flexible tube, such as a hose or the like, and the other terminal of the hose may be brought to the automobile, or tank to be filled.

A cylindrical casing 40 is provided of a diameter to inclose the lower casing 11, which it surrounds when the casing 40 is in lowered position. A pulley 41 is mounted in an opening in the upper end of each of the tubular uprights 14, and a flexible element, such as a cable 42 is passed around each pulley, with one end of each cable connected to the casing 40 and its other end provided with a counter weight 43 which is designed for movement within the tubular uprights 14, the counter weights being designed to balance the weight of the movable casing 40 so that the same may be lifted or lowered without effort. To secure the plate 19 to the container, to prevent movement thereof, a strap 44 of metal or the like may embrace the plate 19 being secured to the periphery thereof and extend around the tubular uprights 14 as shown in Fig. 2.

In operation, when dispensing liquid fuel, the handle 34 of the pump 33 is operated so as to withdraw the fuel from the tank 30 and transfer the same to the transparent container 18, the valve 37 being open. The fuel is continued to be introduced into the container 18 until the level arrives at a point on the scale 25 corresponding to the quantity of fuel desired by the purchaser. The valve 37 is then moved to closed position. If the valve 39 is now moved to open position, the fluid can flow through the flexible connection mentioned above into the tank of an automobile by gravity. During the discharge of fuel from the container 18, air is permitted to enter the upper portion of said container through the vent 31, tank 30 and through the overflow pipe 29, entering the container 18 through the upper end of the tube 25. Also, when the fluid is pumped into the container 18 the air may be displaced therefrom by entering the pipe 25, pipe 29, tank 30 and out through the vent 31. In this manner it is unnecessary to provide any vent opening for the container 18. Should the level of the fuel within the container 18 arrive to a point above the upper end of the tubular member 29 as when a quantity of fluid equal to the capacity of the container 18 is dispensed, the said fuel will flow into the pipe 25 and back into the tank 30.

As stated above the tubular member 25 is adjustable vertically within the transparent container. This is to permit adjustment of the scales to the containers 18. The containers 18 are preferably of glass, and when destroyed or broken can be readily replaced by another. However, it has been my experience that it is a difficult matter to blow or form these transparent containers to a uniform capacity, the containers varying one from another in internal diameter. Therefore, I make the tube 25 adjustable. Thus, when the capacity of the container is to be tested, a predetermined and known quantity of fluid is poured thereinto and the tubular member 25 and scale 32 adjusted vertically until the level of the fuel corresponds to the graduation indicating the same quantity of fuel. For this purpose the tubular member 26 can be slightly loosened so as to relieve pressure upon the gasket 27 and when the tubular member 25 is properly adjusted, the bolts entering the flange 28 may be tightened to again compress the gasket whereby to form a fluid tight joint.

When the super-structure of the apparatus is to be covered, the casing 40 is raised to an upper position whereby its upper end may encircle and embrace the lower end of the conical cap 15, the upward movement of said casing being limited by engagement with the annular bead or flange 17. As stated above the weight of the casing 14 is counter-balanced by the counterweights 43 which descend as the casing is elevated. When the casing 40 is thus elevated it may be locked into position by any suitable means indicated generally at 45.

While I have illustrated and described my invention with some degree of particularity, I realize that in practice various alterations thereover may be made, and I therefore desire to reserve the right and privilege of changing the form of the details of construction, or otherwise altering the arrangement of the correlative parts without departing from the spirit of the invention or the scope of the appended claims.

Having thus described my invention what I claim as new and desire to secure by Letters Patent is:—

1. A liquid fuel dispenser including a cylindrical base portion, a pair of tubular uprights mounted thereon, a temporary transparent fluid container mounted between the uprights adjacent the upper end thereof, a pump mounted on the base portion, a pipe connecting the pump with the transparent container, a tank to contain a source of supply, a pipe connecting said tank to the pump, an overflow pipe extending centrally through the container and into the tank, and a valve controlled outlet for the container.

2. A liquid fuel dispenser including a cylindrical base portion, a pair of tubular uprights mounted thereon, a transparent container mounted between the uprights above the base portion a cylindrical casing movable from a position surrounding the base portion, to a position to surround the container, pulleys mounted in the upper ends of the uprights and flexible elements passing around the pulleys connected at one of their ends to the casing and having counter weights secured to their other ends, said counter-weights being housed within the tubular uprights.

In testimony whereof I affix my signature in presence of two witnesses.

ELBY R. MILLS.

Witnesses:
  T. O. DAKIN,
  P. B. MILLS.